(12) United States Patent
Nam et al.

(10) Patent No.: US 9,612,376 B2
(45) Date of Patent: Apr. 4, 2017

(54) PREPARING METHOD FOR THIN POLARIZER, THIN POLARIZER AND POLARIZING PLATE COMPRISING THE SAME

(71) Applicant: LG CHEM, LTD., Seoul (KR)

(72) Inventors: Sung-Hyun Nam, Daejeon (KR); Jong-Hyun Jung, Daejeon (KR); Kyun-Il Rah, Daejeon (KR); Hye-Min Yu, Daejeon (KR); Ji-Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 141 days.

(21) Appl. No.: 14/240,925

(22) PCT Filed: Nov. 15, 2013

(86) PCT No.: PCT/KR2013/010430
§ 371 (c)(1),
(2) Date: Feb. 25, 2014

(87) PCT Pub. No.: WO2014/077636
PCT Pub. Date: May 22, 2014

(65) Prior Publication Data
US 2015/0301252 A1  Oct. 22, 2015

(30) Foreign Application Priority Data

Nov. 16, 2012 (KR) .......... 10-2012-0130577
Nov. 14, 2013 (KR) .......... 10-2013-0138377

(51) Int. Cl.
*G02B 1/08* (2006.01)
*G02B 5/30* (2006.01)
(Continued)

(52) U.S. Cl.
CPC .......... *G02B 5/3033* (2013.01); *B32B 37/182* (2013.01); *G02B 1/08* (2013.01);
(Continued)

(58) Field of Classification Search
CPC .... G02B 5/3033; G02B 5/305; G02B 5/3083; G02B 5/3008; G02B 1/08;
(Continued)

(56) References Cited

U.S. PATENT DOCUMENTS

2006/0210768 A1\*  9/2006  Masuda ............. B29C 33/68
                                                          428/141
2008/0158676 A1   7/2008  Sugino et al.
(Continued)

FOREIGN PATENT DOCUMENTS

CN         101309990 A    11/2008
FR   WO 2014147439 A1 \*  9/2014 ............ G02B 1/04
(Continued)

OTHER PUBLICATIONS

Patent No. Machine Translation of JP2010224345 A Publication date:Oct. 7, 2010 Name of the country: Japan Name of the patentee: Sone Atsushi.\*

(Continued)

*Primary Examiner* — Bumsuk Won
*Assistant Examiner* — Henry Duong
(74) *Attorney, Agent, or Firm* — Dentons US LLP

(57) ABSTRACT

Provided are a method for preparing a thin polarizer, including forming a film laminate by bonding a non-stretched polyvinyl alcohol-based film having a thickness of 10 to 60 μm to at least one surface of a non-stretched base film using an adhesive including an amine-based metal compound crosslinking agent and a polyvinyl alcohol-based resin containing an acetoacetyl group, and stretching the film laminate so as to allow the polyvinyl alcohol-based film to have (Continued)

a thickness of 10 μm or less, and a thin polarizer manufactured through the same.

10 Claims, 3 Drawing Sheets

(51) Int. Cl.
   *B32B 37/18* (2006.01)
   *B32B 38/00* (2006.01)
   *B32B 38/14* (2006.01)
(52) U.S. Cl.
   CPC ........... *B32B 38/0012* (2013.01); *B32B 38/14* (2013.01); *B32B 2038/0028* (2013.01); *B32B 2307/402* (2013.01); *B32B 2307/42* (2013.01); *B32B 2457/20* (2013.01); *B32B 2551/00* (2013.01)
(58) Field of Classification Search
   CPC ............. G02F 1/133528; B32B 37/182; B32B 2457/20; B32B 2307/42; B32B 38/14; B32B 38/0012; B32B 2038/0028; B32B 2307/402; B32B 2551/00
   USPC ..................................... 359/487.02
   See application file for complete search history.

(56) References Cited

U.S. PATENT DOCUMENTS

| | | | |
|---|---|---|---|
| 2008/0241548 A1 | 10/2008 | Terashima et al. | |
| 2008/0278810 A1* | 11/2008 | Kim | C09J 129/04 359/485.01 |
| 2009/0207491 A1* | 8/2009 | Takebe | G02B 5/305 359/489.2 |
| 2010/0202051 A1 | 8/2010 | Yoshimi et al. | |
| 2010/0220392 A1* | 9/2010 | Tomoguchi | G02B 1/105 359/485.01 |
| 2011/0315306 A1* | 12/2011 | Goto | G02B 5/3033 156/229 |
| 2012/0262639 A1* | 10/2012 | Kim | G02B 27/2214 349/15 |
| 2013/0135725 A1 | 5/2013 | Mori et al. | |
| 2013/0220525 A1 | 8/2013 | Kunai | |

FOREIGN PATENT DOCUMENTS

| | | | |
|---|---|---|---|
| JP | 1976069644 A | | 6/1976 |
| JP | 06347641 A | | 12/1994 |
| JP | 2004017611 A | * | 1/2004 |
| JP | 2008-122502 A | | 5/2008 |
| JP | 2008-221753 A | | 9/2008 |
| JP | 2008225090 A | | 9/2008 |
| JP | 2008536160 A | | 9/2008 |
| JP | 2010-224345 A | | 10/2010 |
| JP | 2010224345 A | | 10/2010 |
| JP | 2011-212550 A | | 10/2011 |
| JP | 2012-118521 A | | 6/2012 |
| JP | 2012118521 A | | 6/2012 |
| JP | 2012-159778 A | | 8/2012 |
| JP | 2012-208534 A | | 10/2012 |
| KR | 10-2007-0078734 A | | 8/2007 |
| KR | 10-2010-0071998 A | | 6/2010 |
| TW | 200738837 A1 | | 10/2007 |
| TW | 200844506 A1 | | 11/2008 |
| TW | 201044033 A1 | | 12/2010 |
| WO | 2010100917 A1 | | 9/2010 |
| WO | 2012/033153 A1 | | 3/2012 |

OTHER PUBLICATIONS

TW Office Action, Application No. 102141681, dated Oct. 29, 2015.
JP Office Action, Application No. 2014-548707, dated Nov. 4, 2015.

* cited by examiner embodiment 1    embodiment 2    Comparative example 1    Comparative example 2    Comparative example 3

Embodiment 3    Comparative Example 4

PREPARING METHOD FOR THIN POLARIZER, THIN POLARIZER AND POLARIZING PLATE COMPRISING THE SAME

This application is a National Stage Application of International Patent Application No. PCT/KR2013/010430, filed on Nov. 15, 2013, which claims priority to and the benefit of Korean Patent Application Nos. 10-2012-0130577, filed on Nov. 16, 2012 and 10-2013-0138377, filed on Nov. 14, 2013 in the Korean Intellectual Property Office, all of which are hereby incorporated by reference.

TECHNICAL FIELD

The present disclosure relates to a method for preparing a thin polarizer, and a thin polarizer and a polarizing plate prepared using the same, and more particularly, to a method for preparing a thin polarizer having a relatively reduced thickness of 10 μm or less, and a thin polarizer and a polarizing plate manufactured using the same.

BACKGROUND ART

Polarizers used in polarizing plates, optical devices enabling natural light or optional polarized light to be converted into polarized light in a certain direction, have been widely used in display devices such as liquid crystal displays and organic light emitting diodes. As a polarizer currently used in such display devices, a polyvinyl alcohol-based polarizing film containing an iodine compound or a dichroic dye and having molecular chains stretched in a predetermined direction has generally been used.

The polyvinyl alcohol-based polarizing film may be prepared by dyeing a polyvinyl alcohol film with iodine or a dichroic dye, and then stretching the film in a predetermined direction and crosslinking the film. In the case, the stretching process may be performed through wet stretching undertaken in a solution such as an aqueous boric acid solution or an aqueous iodine solution, dry stretching undertaken in the atmosphere, or the like, and a stretching magnification of 5 or more times may be generally provided. However, in such a preparing process according to the related art, a polyvinyl alcohol-based film needs to have a thickness exceeding 60 μm, prior to a stretching thereof, in order to perform stretching thereon without the occurrence of breakage. In a case in which the thickness of the polyvinyl alcohol-based film prior to the stretching is less than 60 μm, a degree of swelling in the polyvinyl alcohol-based film may be increased, and the modulus acting per unit area during the stretching process may be increased due to the small thickness, such that breakage of the film may easily occur.

Meanwhile, in accordance with the recent trend for the thinning of display devices, polarizing plates also need to have a reduced thickness. However, in a case in which a polyvinyl alcohol-based film having a thickness exceeding 60 μm is used according to the related art, reducing the thickness of a polarizer may be restricted. Therefore, research into manufacturing a polarizer having a reduced thickness has been carried out.

Korean Patent Laid-Open Publication No. 2010-0071998 discloses a method for manufacturing a thin polarizer using a laminate fabricated by coating a hydrophilic polymer layer on a base layer, or co-extruding a base layer-forming material and a hydrophilic polymer layer-forming material. However, in the case of a coating or co-extruding method, a polyvinyl alcohol layer and the base layer may not be easily separated after stretching, and in order to perform the separation thereof, a high degree of peeling strength may be required. Thus, defects such as damage to or a deformation in the polyvinyl alcohol layer may be easily generated in a separation process and consequently, optical properties such as a degree of polarization and the like, of a polyvinyl alcohol film, are deteriorated. Moreover, in the case of using the coating or co-extruding method, since the polyvinyl alcohol film is manufactured by melting a polyvinyl alcohol resin and then extruding a film, or is manufactured by preparing the resin as a coating solution and then coating the solution, properties of the correspondingly manufactured polyvinyl alcohol film may be easily changed depending on extruding conditions, coating conditions or film forming conditions. Thus, properties of the finally manufactured polyvinyl alcohol film may be deteriorated and further, uniform properties may not be implemented therein.

Furthermore, Japanese Patent Laid-Open Publication No. 2012-118521 discloses a method for manufacturing a thin polarizer by bonding a polyvinyl alcohol film to one surface of a base film using a water-based polyvinyl alcohol adhesive and then stretching the film. However, in the case of general polyvinyl alcohol-based adhesives, water resistance is degraded such that adhesives melt and flow due to the infiltration of moisture in stretching and cleaning processes to cause uneven adhesion between base films and polyvinyl alcohol films while increasing the occurrence of fractures during stretching processes. Furthermore, after polyvinyl alcohol films and base films are bonded to each other, a large amount of fine wrinkles in the form of cracks may be generated in surfaces thereof due to a difference in degrees of swelling between base films and polyvinyl alcohol films such that surface states may be defective. Further, a phenomenon in which side portions thereof curl after a stretching process may occur.

DISCLOSURE

Technical Problem

An aspect of the present disclosure may provide a method for preparing a thin polarizer having excellent optical properties, being available for high magnification stretching, and having relatively high process stability.

Technical Solution

According to an aspect of the present disclosure, a method for preparing a thin polarizer may include: forming a film laminate by bonding a non-stretched polyvinyl alcohol-based film having a thickness of 10 to 60 μm to at least one surface of a non-stretched base film using an adhesive including an amine-based metal compound crosslinking agent and a polyvinyl alcohol-based resin containing an acetoacetyl group; and stretching the film laminate so as to allow the polyvinyl alcohol-based film to have a thickness of 10 μm or less.

In this case, the adhesive may include 1 to 50 parts by weight of the amine-based metal compound crosslinking agent and 100 parts by weight of the polyvinyl alcohol-based resin containing the acetoacetyl group. In further detail, the adhesive may be an aqueous solution including the amine-based metal compound crosslinking agent and the polyvinyl alcohol-based resin containing the acetoacetyl group. In this case, a pH of the aqueous solution may be around 4.5 to 9.

In the case of the adhesive, a content of a solid of the polyvinyl alcohol-based resin including the acetoacetyl group may be within a range of 1 to 10 weight %.

The amine-based metal compound crosslinking agent may be a metal mixture containing an amine-based ligand and may include one or more types of amine groups selected from a group consisting of a primary amine, a secondary amine, a tertiary amine, and ammonium hydroxide, as a ligand, in one or more transition metals selected from a group consisting of, for example, zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), and platinum (Pt).

The base film may be a polymer film of which a maximum stretching magnification is five times or more, and for example, may be one or more selected from a group including a high-density polyethylene film, a polyurethane film, a polypropylene film, a polyolefin film, an ester-based film, a low-density polyethylene film, high-density polyethylene and low-density polyethylene co-extrusion films, a copolymer resin film containing ethylene vinyl acetate in high-density polyethylene, an acrylic film, a polyethylene terephthalate film, a polyvinyl alcohol-based film, and a cellulose-based film.

The stretching of the film laminate may be performed through a dry stretching process or a wet stretching process, and may be performed at a magnification at which a stretching magnification thereof is 5 to 15 times, at a temperature of 20° C. to 85° C. In addition, the stretching of the film laminate may be performed within a boric acid aqueous solution.

The method may further include dyeing the film laminate with at least one of iodine and dichroic dye before the stretching of the film laminate is performed.

The method for preparing a thin polarizer may further include separating the polyvinyl alcohol-based film from the base film after the stretching of the film laminate is performed. In this case, the separating of the polyvinyl alcohol-based film from the base film may be performed by applying peeling strength of 2N/2 cm or less thereto.

According to an aspect of the present disclosure, a thin polarizer may be manufactured through the method described above and may have a thickness of 10 μm or less, may have a single body transmittance of 40 to 45%, and may have a degree of polarization of 99.9% or more, and a polarizing plate including the same may be provided.

Advantageous Effects

According to an embodiment of the present disclosure, a thin polarizer having a thickness of 10 μm or less and having excellent optical properties may be manufactured with process stability.

DESCRIPTION OF DRAWINGS

The above and other aspects, features and other advantages will be more clearly understood from the following detailed description taken in conjunction with the accompanying drawings, in which.

BEST MODE FOR INVENTION

Figure 1:
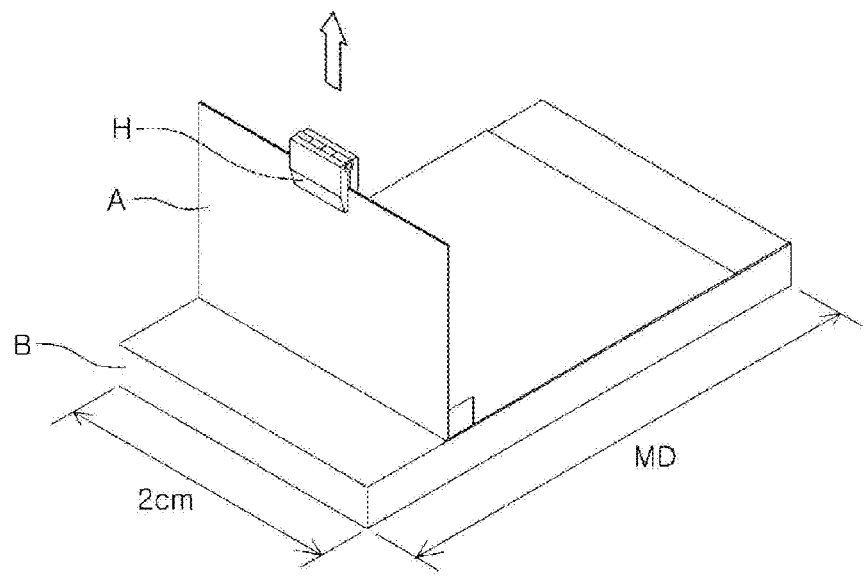
FIG. 1 is a drawing illustrating an adhesive force measuring method using a texture analyzer.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure is provided after a long period of research undertaken by the inventors, investigating the reasons for which fractures occur during a stretching process when a base film is bonded to a polyvinyl alcohol (PVA)-based film using an adhesive according to the related art, and the reason thereof was discovered to be that an adhesive, according to the related art, may be exposed to moisture to melt and flow so as to cause uneven adhesion between the base film and the polyvinyl alcohol-based film in the case of an existing adhesive. In other words, the present disclosure is provided by considering that a base film and a polyvinyl alcohol-based film may be bonded to each other using an adhesive having excellent water resistance properties such that the occurrence of fractures during a stretching process may be significantly reduced.

In further detail, a method for preparing a thin polarizer according to an embodiment of the present disclosure may include forming a film laminate by bonding a non-stretched polyvinyl alcohol-based film having a thickness of 10 to 60 μm to at least one surface of a non-stretched base film using an adhesive including an amine-based metal compound crosslinking agent and a polyvinyl alcohol-based resin containing an acetoacetyl group; and stretching the film laminate so as to allow the polyvinyl alcohol-based film to have a thickness of 10 μm or less.

First, a film laminate may be formed by bonding a non-stretched polyvinyl alcohol-based film to at least one surface of a non-stretched base film using an adhesive. In this case, a method of forming the film laminate may be performed according to a publicly disclosed film stacking method. For example, an adhesive may be coated on one surface of the non-stretched base film or polyvinyl alcohol-based film, and the base film and the polyvinyl alcohol-based film may then be stacked on each other, to then be heated, or heated and pressed, using a laminator or the like.

On the other hand, according to an embodiment of the present disclosure, an adhesive including an amine-based metal compound crosslinking agent and a polyvinyl alcohol-based resin containing an acetoacetyl group may be used such that the non-stretched base film and the non-stretched polyvinyl alcohol-based film are stacked on each other. In the case of the adhesive including an amine-based metal compound crosslinking agent and a polyvinyl alcohol-based resin containing an acetoacetyl group, since a crosslinking reaction occurs between the amine-based metal compound and the acetoacetyl group of the polyvinyl alcohol-based resin at the time of curing the adhesive, water resistance properties of an adhesive layer after curing may be significantly improved, and as a result, defects due to insufficient water resistance in a polyvinyl alcohol-based adhesive according to the related art may be improved.

In further detail, the adhesive used in the present disclosure may be an aqueous solution including an acetoacetyl group-containing polyvinyl alcohol-based resin and an amine-based metal compound crosslinking agent, and in this case, a pH of the aqueous solution may be about 4.5 to 9. When a pH of the adhesive satisfies the numerical range described above, storage properties and durability in a high moisture environment may be further improved.

On the other hand, a pH of the adhesive may be adjusted through a method of including an acid in an aqueous solution, and in this case, as acid used to adjust the pH thereof, strong acid and weak acid may both be used. For example, nitric acid, hydrochloric acid, sulfuric acid, acetic acid, or the like may be used.

In addition, in the present disclosure, the adhesive may include the acetoacetyl group-containing polyvinyl alcohol-based resin of 100 parts by weight and the amine-based metal compound crosslinking agent of 1 to 50 parts by weight.

Here, although a degree of polymerization and a degree of hydrosis of the polyvinyl alcohol-based resin are not particularly limited as long as the polyvinyl alcohol-based resin only includes an acetoacetyl group, a degree of polymerization thereof may be 200 to 4,000, and a degree of hydrosis thereof may be 70 mol % to 99.9 mol %. In further detail, in consideration of flexible mixing thereof with a material contained therein, according to molecular movement, the degree of polymerization may be 1,500 to 2,500, and the degree of hydrosis may be 90 mol % to 99.9 mol %. In this case, the polyvinyl alcohol-based resin may include the acetoacetyl group of 0.1 to 30 mol %. The action thereof with the amine-based metal compound crosslinking agent may be smooth within the range described above, and water resistance of a targeted adhesive may be sufficiently significant.

The amine-based metal compound crosslinking agent is a water-soluble crosslinking agent having a functional group having reactivity with the polyvinyl alcohol-based resin, and may have a metal mixture form containing an amine-based ligand. As a metal available for use therein, a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), platinum (Pt), or the like may be used. As a ligand combined with a central metal, any ligand may be used, as long as it includes at least one amine group formed of a material such as a primary amine, a secondary amine (diamine), a tertiary amine, ammonium hydroxide, or the like. The use thereof may be adjusted to be within a range of 1 to 50 parts by weight with respect to the polyvinyl alcohol-based resin of 100 parts by weight. In this range, sufficiently significant adhesive force may be provided to a targeted adhesive and storage stability (pot life) of the adhesive may be improved.

In addition, in the case of the adhesive according to an embodiment of the present disclosure, a content of a solid of the polyvinyl alcohol-based resin including the acetoacetyl group may be within a range of about 1 to 10 weight %. When the solid content of the polyvinyl alcohol-based resin is less than 1 weight %, since water resistance thereof may not be sufficiently secured, an effect of reducing the occurrence of fractures in the stretching process may be relatively low. When the solid content of the polyvinyl alcohol-based resin exceeds 10 weight %, users' working power may be weakened, and at the time of performing a separation process, a surface of the polyvinyl alcohol-based film may be damaged.

On the other hand, in the present disclosure, a thickness of the adhesive layer formed by the adhesive may be around 80 nm to 200 nm, or in further detail, around 80 nm to 150 nm, before the stretching process of the film laminate is performed, and may be around 10 nm to 100 nm, or in further detail, around 10 nm to 80 nm, after the stretching process is performed. When the thickness of the adhesive layer satisfies the range described above, adhesive force between the base film and the polyvinyl alcohol-based film may be maintained at an appropriate degree such that damage to a polarizer surface may be significantly decreased at the time of performing a separation process while lowering the occurrence of fractures therein during the stretching process.

In addition, the adhesive force between the base film and the non-stretched polyvinyl alcohol-based film may be 2N/2 cm or less, in detail, around 0.1 to 2N/2 cm, or in further detail, around 0.1 to 1N/2 cm, but should not be considered as being limited thereto. When the adhesive force between the base film and the non-stretched polyvinyl alcohol film satisfies the range described above, the base film and the non-stretched polyvinyl alcohol-based film may not be separated from each other during the stretching process, and damage to a surface may be significantly reduced in a separation process after the stretching process is performed. In this case, the adhesive force may be measured when samples, for example, films having a length of 2 cm, are adhered, and a detailed measuring method is illustrated in FIG. 1. In the present disclosure, the adhesive force between the films indicates peeling strength measured when separating a polyvinyl alcohol film A from a base film B by applying force in a vertical direction with respect to a surface direction of the film laminate after fixing the polyvinyl alcohol film A of the film laminate using a sample holder H, as illustrated in FIG. 1. In this case, as the measuring device, a TextureAnalyzer (TA-XT Plus) by Stable Micro Systems was used.

On the other hand, in order to provide adequate adhesive force at the time of adhering the base film to the polyvinyl alcohol-based film, one surface or both surfaces of the base film or the polyvinyl alcohol-based film may be subjected to a surface treatment. In this case, the surface treatment may be performed through various publicly disclosed surface treatment methods, for example, a corona treatment method, a plasma treatment method, a surface modification treatment method using a strong alkaline aqueous solution such as NaOH or KOH, and the like.

Meanwhile, the non-stretched polyvinyl alcohol-based film may be bonded to one surface or both surfaces of the non-stretched base film. In consideration of productivity and stability in a process, the polyvinyl alcohol-based film may be bonded to both surfaces of the non-stretched base film. When the polyvinyl alcohol-based film is bonded to both surfaces of the base film, since balancing modulus per unit area and tension in the stretching process may be relatively easy as compared to the case in which the polyvinyl alcohol-based film is only adhered to one surface of the non-stretched base film, two thin polarizers may be obtained through one process to improve productivity as well as having excellent process stability.

In addition, the non-stretched base film may be provided to prevent the polyvinyl alcohol-based film from being fractured in the stretching process and may be a polymer film having a maximum stretching magnification of five or more times under a temperature condition of 20° C. to 85° C. In this case, the maximum stretching magnification refers to a stretching magnification immediately before fractures occur. On the other hand, the above-mentioned stretching may refer to a dry stretching process or a wet stretching process. In the case of the wet stretching process, concentration of boron may indicate a maximum stretching magnification in a case in which the stretching process is performed using a boric acid aqueous solution having concentration of boron of 1.0 to 5 weight %.

As such a base film, for example, a high-density polyethylene film, a polyurethane film, a polypropylene film, a polyolefin film, an ester-based film, a low-density polyethylene film, high-density polyethylene and low-density polyethylene co-extrusion films, a copolymer resin film in which ethylene vinyl acetate is contained in high-density polyethylene, an acrylic film, a polyethylene terephthalate film, a polyvinyl alcohol-based film, a cellulose-based film, or the like may be used, but should not be considered as being limited thereto.

Subsequently, the non-stretched polyvinyl alcohol-based film bonded to the base film may have a thickness of around 10 µm to 60 µm, or in further detail, around 10 µm to 40 µm. When the thickness of the polyvinyl alcohol-based film exceeds 60 µm, it may be difficult to implement a thickness less than of 10 µm even when the stretching process is performed, and when the thickness thereof is less than 10 µm, fractures may easily occur during the stretching process.

In addition, the polyvinyl alcohol-based film may have a degree of polymerization of around 1,000 to 10,000, or in further detail, around 1,500 to 5,000, but should not be considered as being limited thereto. When the degree of polymerization satisfies the range described above, a molecule movement may be facilitated, and molecules may be smoothly mixed with iodine, dichroic dye or the like.

Further, as the polyvinyl alcohol-based film according to an embodiment of the present disclosure, polyvinyl alcohol-based films for sale in the market may be sued, and for example, PE20, PE30, PE60 by Curare, M2000, M3000, M6000 by Nippon Gohsei, or the like may be used.

On the other hand, the film laminate may be formed by bonding the polyvinyl alcohol-based film onto the base film, and the film laminate may then be stretched. In this case, the stretching process may be performed such that the polyvinyl alcohol-based film may have a thickness of 10 µm or less, and for example, may have a thickness of around 1 µm to 10 µm, 3 µm to 10 µm, or in further detail, 1 µm to 5 µm.

In the present disclosure, in the case of the stretching condition, for example, the stretching process may be performed to have a stretching magnification of five to fifteen times at a temperature of 20° C. to 85° C., and in further detail, may be performed to have a stretching magnification of five to twelve times at a temperature of 40° C. to 80° C.

Here, the stretching process may be a wet stretching process or a dry stretching process. However, when the wet stretching process is performed, since surface adhesion force between the base film and the polyvinyl alcohol-based film becomes relatively strong as compared to the case of the dry stretching process, a stable stretching process may be performed. Further, the wet stretching process may be performed using a boric acid aqueous solution, and in this case, a concentration of boron in the boric acid aqueous solution may be around 1.0 to 5.0 wt %.

When the stretching process is performed using the boric acid aqueous solution as described above, the occurrence of fractures in a PVA film may be decreased due to boric cross-linking such that stability in a process may be increased and the occurrence of wrinkles on the PVA FILM, liable to occur in the wet process, may be controlled. In addition, the stretching process may also be performed at a relatively low temperature as compared to the case of the dry stretching process.

On the other hand, a process of manufacturing a polarizing element may generally include a washing process, a swelling process, a dyeing process, a cleaning process, a stretching process, a complementary process, a drying process, and the like, but in the case of the present disclosure, the cleaning and stretching processes may be performed using a boric acid aqueous solution. In detail, in the case of the cleaning process, the concentration of boron may be within a range of around 0.1 to 2.5 wt %, or in further detail, around 0.5 to 2.0 wt %, and in the case of the stretching process, the concentration of boron may be within a range of around 1.0 to 5.0 wt %, or in further detail, 1.5 to 4.5 wt %.

The stretching process may be performed together with dyeing the polyvinyl alcohol-based film with iodine and/or dichroic dye, and/or crosslinking the dyed iodine and/or the dyed dichroic dye with the polyvinyl alcohol-based film.

For example, the stretching process may be performed using an aqueous solution including iodine and/or dichroic dye, and boron, for example, within the aqueous solution, such that dyeing, crosslinking and stretching processes may be performed simultaneously with each other. Alternatively, before the stretching process is performed, the dyeing process may be performed by soaking the film laminate in an aqueous solution including iodine and/or dichroic dye, and then, the dyed film laminate may be immersed in the boric acid aqueous solution and subjected to the stretching process therein, such that the crosslinking process and the stretching process may also be performed together.

After the film laminate is stretched as described above, the stretched film laminate may further be subjected to a drying process as needed. In this case, the drying process may be performed at a temperature of around 20° C. to 100° C., or in further detail, around 40 to 90° C., for 1 to 10 minutes. The drying process may prevent a PVA polarizer from being deteriorated in physical properties due to moisture during a polarizing plate manufacturing process, through removal of moisture from a PVA surface and inside, and may induce shrinkage in a width direction of the stretched polyvinyl alcohol film to be smoothly performed during the drying process so as to increase directivity of a dyed body including polyvinyl alcohol and iodine and thus improve a degree of polarization of the polarizer.

On the other hand, after the film laminate is stretched as described above, the stretched film laminate may further be subjected to a process of separating the polyvinyl alcohol-based film from the base film as needed. The separation process may be carried out through a method of applying peeling strength to the polyvinyl alcohol-based film or the base film such that both films are detached from each other. In this case, the peeling strength may be 2N/2 cm or less, and for example, may be around 0.1 to 2N/2 cm, or in further detail, around 0.1 to 1N/2 cm. When the adhesive according to an embodiment of the present disclosure is used, since the peeling strength required at the time of separating the polyvinyl alcohol-based film from the base film is relatively weak as compared to the case in which a polyvinyl alcohol resin layer is formed on a base film through a coating method or a co-extrusion method, both films may be easily separated from each other without a separate process and without using separate devices, and damage to the polyvinyl alcohol-based film may be significantly reduced in the separation process such that significantly excellent performance may be provided thereby.

When the separation process is completed as described above, the polyvinyl alcohol-based polarizer having a thickness of 10 μm or less may be obtained. In a case in which the polyvinyl alcohol-based film is adhered to both surfaces of the base film, two thin polarizers may be obtained through a single process. The polarizer of the present disclosure manufactured through the method described as above may have a significantly reduced thickness of 10 μm or less, for example, around 1 μm to 10 μm, around 3 μm to 10 μm, or in further detail, around 1 μm to 5 μm, and may have single body transmittance of around 40 to 45%, and a degree of polarization of 99.0% or more, 99.5% or more, or in further detail, 99.9% or more so as to have significantly excellent optical properties, in a reduced thickness as described above.

In addition, according to an embodiment of the present disclosure, a polarizing plate including the thin polarizer manufactured through the above-mentioned method may be provided.

The polarizing plate according to an embodiment of the present disclosure may be formed by stacking a transparent film on one surface or both surfaces of a thin polarizer of the present disclosure. In this case, as the transparent film, various films used as a polarizer protective film or a retardation film may be used without particular limitation. For example, films including at least one selected from a group consisting of a polyester-based polymer, a styrene-based polymer, a cellulose-based polymer, a polyethersulfone-based polymer, a polycarbonate-based polymer, an acrylic polymer, a polyolefin-based polymer, a polyamide-based polymer, a polyimide-based polymer, a sulfone-based polymer, a polyether ether ketone-based polymer, a polyphenylene sulfide-based polymer, a vinyl alcohol-based polymer, a vinylidene chloride-based polymer, a vinyl butyral-based polymer, an arylate-based polymer, a polyoxymethylene-based polymer, an epoxy-based polymer and mixtures of these polymers may be used.

A method of stacking a polarizer and a transparent film on each other is not particularly limited, and may be performed using a publicly disclosed adhesive, cohesive adhesive, or the like. In this case, the adhesive or the cohesive adhesive may be appropriately selected in consideration of a material of a transparent film, and the like, and for example, as the transparent film, when triacetate cellulose (TAC) is used to form the transparent film, a water-based adhesive such as a polyvinyl alcohol-based adhesive may be used, and when an acrylic film, a COP film or the like is used as the transparent film, a photo-curable adhesive or a thermal curable adhesive such as an acrylic adhesive or an epoxy-based adhesive may be used.

In addition, the polarizing plate according to an embodiment of the present disclosure may further include a cohesive layer on the thin polarizer or the transparent film of the present disclosure, as needed. In this case, the cohesive layer may be formed through a method in which one or more selected from a group consisting of publicly disclosed cohesive compositions, for example, an acrylic copolymer, an epoxy-based resin, a polyurethane-based resin, a silicon-based resin, a polyether-based resin, a polyamide-based resin and a polyvinyl alcohol-based resin may be covered on the polarizer or the transparent film, and light or heat may then be irradiated thereonto so as to be cured thereon.

In further detail, the polarizing plate of the present disclosure may include the polyvinyl alcohol-based polarizer having a thickness of 10 μm or less, the transparent film adhered to at least one surface of the polyvinyl alcohol-based polarizer through the adhesive layer therebetween, and the cohesive layer formed on the polarizer or the transparent film.

For example, the polarizing plate according to an embodiment of the present disclosure may include a polyvinyl alcohol-based polarizer having a thickness of 10 μm or less, a transparent film adhered to one surface of the polyvinyl alcohol-based polarizer through an adhesive layer therebetween, and a cohesive layer formed on the other surface of the polyvinyl alcohol-based polarizer.

On the other hand, a primer layer, an adhesive layer or the like may be further formed between the cohesive layer and the polyvinyl alcohol-based polarizer and/or between the adhesive layer and the transparent film so as to increase adhesion therebetween.

Mode for Embodiments of Invention

Hereinafter, the present disclosure will be described in further detail, based on the following embodiments.

Manufacturing Example 1

Adhesive A 4 weight % of an aqueous solution was produced by dissolving polyvinyl alcohol (an average degree of polymerization of 2000, a degree of saponification of 94%, By Nippon Gohsei) containing an acetoacetyl group (5 wt %) in pure water. Here, 6.7 parts by weight of a titanium amine complex crosslinking agent (TYZOR TE by Dupont) with respect to 100 parts by weight of polyvinyl alcohol was added and stirred to be mixed so as to manufacture adhesive A.

Manufacturing Example 2

Adhesive B 1 weight % of an aqueous solution was produced by dissolving polyvinyl alcohol (an average degree of polymerization of 2000, a degree of saponification of 94%, By Nippon Gohsei) containing an acetoacetyl group (5 wt %) in pure water. Here, 6.7 parts by weight of a titanium amine complex crosslinking agent (TYZOR TE by Dupont) with respect to 100 parts by weight of polyvinyl alcohol was added and stirred to be mixed so as to manufacture adhesive B.

Manufacturing Example 3

Adhesive C

Adhesive C was produced by dissolving 4 wt % of polyvinyl alcohol (an average degree of polymerization of 2000, a degree of saponification of 94%, By Nippon Gohsei) containing an acetoacetyl group (5 wt %) in pure water.

Manufacturing Example 4

Adhesive D

A polyvinyl alcohol-based adhesive (JC25 by JAPAN VAM & POVAL Co., Ltd) having 4 wt % of solid, commercially available, was prepared.

Embodiment 1

The adhesive A was applied to both surfaces of a thermoplastic polyurethane base having a thickness of 40 μm, and then, an M2000 grade 20 μm PVA film by Nippon Gohsei was stacked thereon to then be passed through a laminator so as to form a film laminate.

Embodiment 2

A film laminate was formed through the same method as that of embodiment 1 except for using adhesive B instead of adhesive A.

Comparative Example 1

A film laminate was formed through the same method as that of embodiment 1 except for using adhesive C instead of adhesive A.

Comparative Example 2

A film laminate was formed through the same method as that of embodiment 1 except for using adhesive D instead of adhesive A.

Comparative Example 3

A film laminate was formed by stacking an M2000 grade 20 μm PVA film of Nippon Gohsei on both surfaces of a thermoplastic polyurethane base having a thickness of 40 μm.

Experimental Example 1

Evaluation of Water Resistance Properties

Figure 2:
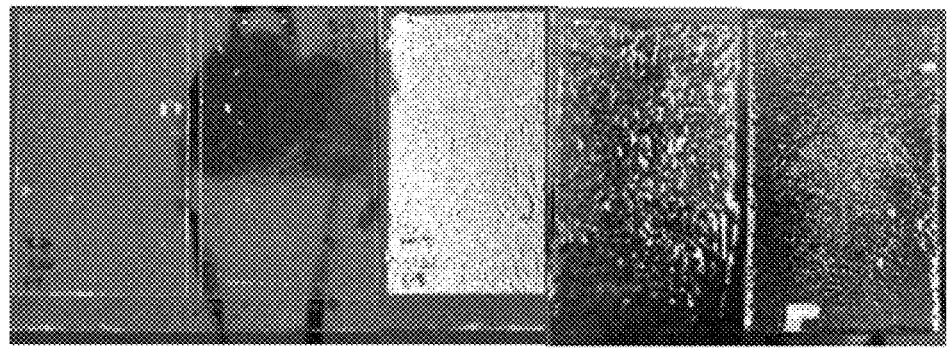
FIG. 2 provides photos illustrating experimental results of water resistance of film laminates in embodiments 1 and 2 and comparative examples 1 to 3.

The film laminates of embodiments 1 and 2 and comparative examples 1 to 3 were immersed in water of 60° C. for five minutes, and then, a surface state thereof was evaluated. FIG. 2 provides photos illustrating a surface state of the film laminates provided after the immersion process was carried out.

As illustrated in FIG. 2, it can be appreciated that in the case of embodiments 1 and 2, the surfaces of the film laminates were kept clean after the immersion process, while in the case of comparative examples 1 and 2, the film laminates had wrinkles on surfaces thereof. This is due to a phenomenon in which the adhesives of comparative examples 1 and 2 melt in water and flow such that a base film and a PVA film may not be uniformly adhered to each other, but may be partially adhered to each other. In the case of the film laminate in a non-uniform surface state as described above, tension applied to respective portions thereof may be changed to cause the occurrence of fractures therein in a stretching process. In the case of comparative example 3, wrinkles occurred on a surface, but the amount of wrinkles was relatively reduced as compared to the cases of comparative examples 1 and 2.

Embodiment 3

The film laminate manufactured according to embodiment 1 swelled in a pure solution at 25° C. for 15 seconds, and was then subjected to a dyeing process performed using an iodine solution having a concentration of 0.3 wt % at a temperature of 25° C. for 60 seconds. Then, a cleaning process was carried out using a solution including 1 wt % of boron at a temperature of 25° C. for 15 seconds, and then, a stretching process in which a stretching was formed 7 times was performed using a solution including 2.5 wt % of boron at 52° C. After the stretching process was carried out, a complementary process was performed using 5 wt % of a KI solution, and then, the film laminate was dried in an oven of 80° C. for five minutes. Subsequently, a finally obtained thin polarizer having a thickness of 7.5 μm was manufactured by separating the polyvinyl alcohol-based film from the base film through peeling strength of 0.7N/2 cm while holding the polyurethane base film.

Comparative Example 4

The film laminate manufactured according to comparative example 1 swelled in a pure solution at 25° C. for 15 seconds, and was then subjected to a dyeing process performed using an iodine solution having a concentration of 0.3 wt % at a temperature of 25° C. for 60 seconds. Then, a cleaning process was carried out using a solution including 1 wt % of boron at a temperature of 25° C. for 15 seconds, and then, a stretching process in which a stretching was formed 7 times was performed using a solution including 2.5 wt % of boron at 52° C. However, since fractures were formed in the PVA film during the stretching process, a thin polarizer was unable to be manufactured.

Figure 3:
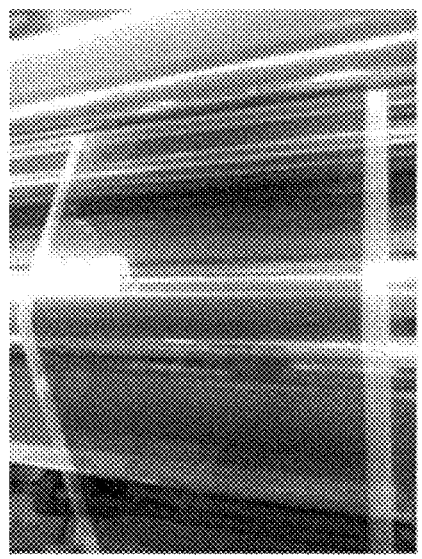
FIG. 3 provides photos illustrating film laminates provided after stretching processes of embodiment 3 and comparative example 4 are performed.
Figure 3:
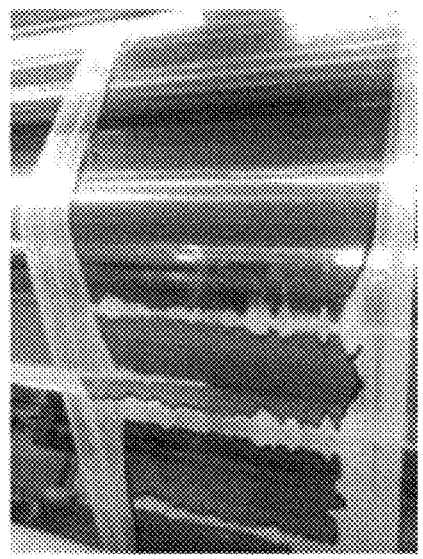

FIG. 3 provides photos illustrating film laminates in a state represented in the stretching processes of embodiment 3 and comparative example 4. With reference to FIG. 3, it can be appreciated that in the case of embodiment 3 in which the film laminate of embodiment 1 was used, stable stretching was performed, while in the case of comparative example 4 in which the film laminate of comparative example 1 was used, fractures occurred during the stretching process. This may be due to stress caused by a reason that the base film and the PVA film having different swelling rates are forcibly and partially bonded using an adhesive.

Comparative Example 5

The film laminate manufactured according to comparative example 2 swelled in a pure solution at 25° C. for 15 seconds, and was then subjected to a dyeing process performed using an iodine solution having a concentration of 0.3 wt % at a temperature of 25° C. for 60 seconds. Then, a cleaning process was carried out using a solution including 1 wt % of boron at a temperature of 25° C. for 15 seconds, and then, a stretching process in which a stretching was formed 6 times was performed using a solution including 2.5 wt % of boron at 52° C. After the stretching process was carried out, a complementary process was performed using 5 wt % of a KI solution, and then, the film laminate was dried in an oven of 80° C. for five minutes. Subsequently, a finally obtained thin polarizer having a thickness of 8.7 μm was manufactured by separating the polyvinyl alcohol-based film from the base film through peeling strength of 2.3N/2 cm while holding the polyurethane base film.

Figure 4:
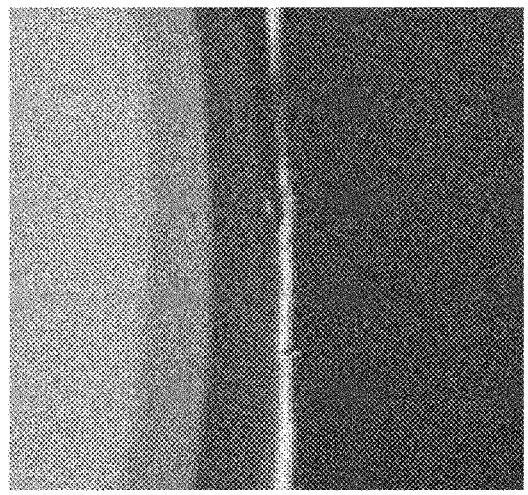
FIG. 4 provides a photo illustrating a phenomenon in which a side portion of a film laminate is curled after a stretching process of comparative example 5 is performed.
Figure 5:
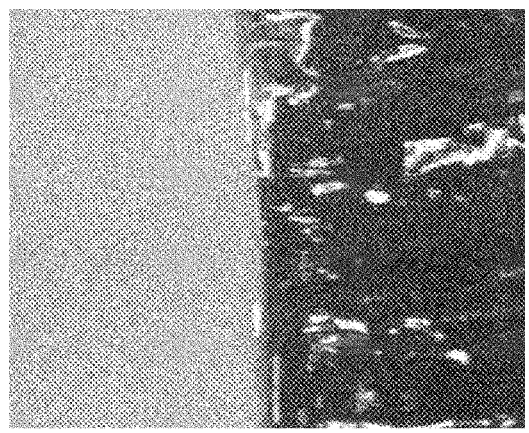
FIG. 5 provides a photo illustrating a film laminate provided after a stretching process of embodiment 3 is performed.

In this case, although fractures did not occur in the stretching process and the cleaning process, a phenomenon in which aside portion of the film laminate was curled was caused after the stretching process. FIG. 4 provides a photo illustrating the film laminate in a state after the stretching process of comparative example 5 is performed. On the other hand, FIG. 5 provides a photo illustrating the film laminate provided after the stretching process of embodiment 3 is performed. As illustrated in FIGS. 4 and 5, the phenomenon in which a side portion of the film laminate was curled after the stretching process occurred in the film laminate of comparative example 5, while such a phenomenon did not occur in the film laminate of embodiment 3.

Meanwhile, in the case in which a stretching magnification of the film laminate manufactured according to comparative example 2 was increased 7 times, fractures occurred in the stretching process similar to the case of comparative example 4.

Comparative Example 6

The film laminate manufactured according to comparative example 3 swelled in a pure solution at 25° C. for 15 seconds, and was then subjected to a dyeing process performed using an iodine solution having a concentration of 0.3 wt % at a temperature of 25° C. for 60 seconds. Then, a cleaning process was carried out using a solution including 1 wt % of boron at a temperature of 25° C. for 15 seconds, and then, a stretching process in which a stretching was formed 6 times was performed using a solution including 2.5 wt % of boron at 52° C. After the stretching process was carried out, a complementary process was performed using 5 wt % of a KI solution, and then, the film laminate was dried in an oven of 80° C. for five minutes. Subsequently, a finally obtained thin polarizer having a thickness of 8.7 µm was manufactured by separating the polyvinyl alcohol-based film from the base film through peeling strength of 0.7N/2 cm while holding the polyurethane base film.

Comparative Example 7

A PVA aqueous solution was formed by dissolving a PVA film (M-grade by Nippon Gohsei, an average degree of polymerization of 2400, a degree of saponification of 99 mol %) in pure water at 100° C., and was then coated on a PET (NOVA-Clear SG007 grade by MGC) having a thickness of 200 µm using a lip coater, to then be dried in an oven of 80° C. for 10 minutes, such that the film having a PVA coating layer formed thereon was formed. In this case, a thickness of the PVA coating layer was 10 µm. The film was subjected to a swelling process performed using a pure solution at 25° C. for 15 seconds, and then subjected to a dyeing process performed using an iodine solution having a concentration of 0.3 wt % at a temperature of 25° C. for 60 seconds. Then, a cleaning process was carried out using a solution including 1 wt % of boron at a temperature of 25° C. for 15 seconds, and then, a stretching process in which a stretching was formed 5.5 times was performed using a solution including 2.5 wt % of boron at 52° C. After the stretching process was carried out, a complementary process was performed using 5 wt % of a KI solution, and then, the film was dried in an oven of 80° C. for five minutes.

Figure 6:
FIG. 6 provides a photo illustrating a film laminate after a stretching process of comparative example 7 is performed.

However, since the PVA coating layer was peeled off in the stretching process, a thin film PVA film was not able to be manufactured. FIG. 6 illustrates the film laminate in a state thereof represented after the film laminate manufactured through the method of comparative example 7 was stretched.

Comparative Example 8

A PVA aqueous solution was formed by dissolving a PVA film (M-grade by Nippon Gohsei, an average degree of polymerization of 2400, a degree of saponification of 99 mol %) in pure water at 100° C., and was then coated on a PET film (NOVA-Clear SG007 grade by MGC) having a thickness of 200 µm using a lip coater, to then be dried in an oven of 80° C. for 10 minutes, such that the film having a PVA coating layer formed thereon was formed. In this case, a thickness of the PVA coating layer was 10 µm. The film was subjected to a swelling process performed using an aqueous solution including 1.0 wt % of boron at 25° C. for 15 seconds, and then subjected to a dyeing process performed using an iodine solution having an iodine concentration of 0.3 wt % and a boron concentration of 3.0 wt % at a temperature of 25° C. for 60 seconds. Then, a cleaning process was carried out using a solution including 1 wt % of boron at a temperature of 25° C. for 15 seconds, and then, a stretching process in which a stretching was formed 5.5 times was performed using a solution including 2.5 wt % of boron at 60° C. After the stretching process was carried out, a complementary process was performed using 5 wt % of a KI solution, and then, the film was dried in an oven of 100° C. for eight minutes. Subsequently, a finally obtained thin polarizer having a thickness of 4 to 4.5 µm was manufactured by separating the polyvinyl alcohol-based film from the base film through peeling strength of 2.7N/2 cm while holding the polyurethane base film.

Experimental Example 2

Evaluation of Physical Optical Properties

In the case of the thin polarizer manufactured according to embodiment 3 and the thin polarizers manufactured according to comparative examples 6 and 8, single body transmittances (Ts), degrees of polarization (DOP), single body colors a and b, and orthogonal colors a and b were measured using JASCO V-7100 Spectrophotometer, and measurement results thereof are provided in the following table 1.

TABLE 1

| Classification | TS (%) | DOP (%) | single body Color | | Orthogonal Color | |
| --- | --- | --- | --- | --- | --- | --- |
| | | | a | b | a | b |
| Embodiment 3 | 42.74 | 99.9704 | −0.94 | 2.33 | 2.68 | −2.32 |
| Comparative Example 6 | 42.90 | 99.7403 | −0.04 | 1.71 | 2.99 | −3.71 |
| Comparative Example 8 | 34.97 | 99.4971 | −0.07 | 0.56 | 2.12 | −3.01 |

As illustrated in table 1 above, it can be appreciated that the thin polarizer of embodiment 3 according to the present disclosure has a significantly excellent polarization degree of 99.9% or more, while the thin polarizers according to comparative examples 6 and 8 have relatively low polarization degrees of 99.7% and 99.5%, respectively, as compared to the case of embodiment 3.

In detail, it can be appreciated that as compared to the case of comparative example 8 using a coating scheme, the thin polarizer of embodiment 3 according to the present disclosure exhibits a relatively high degree of polarization while having relatively high transmittance (Ts), such that relatively further excellent optical performance may be provided.

On the other hand, similar to the case of comparative example 7, when a thin polarizer was manufactured under the same process conditions as those of an embodiment using a coating scheme, since the coated PVA film was peeled off, the manufacturing itself of a thin polarizer was not able to be implemented. When boron was added in the swelling process and the dyeing process and a stretching temperature was increased similar to the case of comparative example 8, a PVA film was able to be manufactured using a coating scheme, but a phenomenon in which transmittance of a polarizer was deteriorated occurred by an increase in a degree of cross-linking of the PVA film due to the addition of boron before the stretching process was performed. Thus, a polarizer satisfying the conditions of transmittance of 40 to 45% and a degree of polarization of 99.0% or more, proposed by the present disclosure, was not able to be manufactured.

Meanwhile, in the case of comparative example 6 in which the film laminate of comparative example 3, without using an adhesive, was used, the stretching process was performed comparatively stably, for 6 times in a stretching magnification. It is considered that the reason is that since an adhesive was not used unlike comparative examples 1 and 2 and thus the base film and the PVA film were completely separated from each other so as to allow comparatively uniform tension to be applied thereto during the stretching process. However, when a stretching magnification was increased to an extent of embodiment 3, fractures also occurred in the film laminate of comparative example 3 such that a thin polarizer having a degree of polarization of 99.90 or more was not able to be manufactured.

While the present disclosure has been shown and described in connection with the embodiments, it will be apparent to those skilled in the art that modifications and variations can be made without departing from the spirit and scope of the present disclosure as defined by the appended claims.

The invention claimed is:

1. A method for preparing a thin polarizer, comprising:
    forming a film laminate by bonding a prefabricated non-stretched polyvinyl alcohol-based film having a thickness of 10 to 60 μm to at least one surface of a non-stretched polyurethane film using an adhesive layer formed by an adhesive including an amine-based metal compound crosslinking agent and a polyvinyl alcohol-based resin containing an acetoacetyl group; and
    stretching the film laminate so as to allow the polyvinyl alcohol-based film to have a thickness of 10 μm or less, and
    separating the polyvinyl alcohol-based film from the polyurethane film after the stretching of the film laminate is performed,
    wherein the stretching of the film laminate is performed through a wet stretching process at a magnification at which a stretching magnification thereof is 7 to 15 times, at a temperature of 20° C. to 85° C.,
    wherein a thickness of the adhesive layer is 80 nm to 200 nm before the stretching process of the film laminate, and 10 nm to 100 nm after the stretching process, and
    wherein the separating of the polyvinyl alcohol-based film from the polyurethane film is performed by applying peeling strength in a range of 0.1N/2 cm to 2N/2 cm thereto.

2. The method of claim 1, wherein the adhesive includes 1 to 50 parts by weight of the amine-based metal compound crosslinking agent and 100 parts by weight of the polyvinyl alcohol-based resin containing the acetoacetyl group.

3. The method of claim 1, wherein the adhesive is an aqueous solution including the amine-based metal compound crosslinking agent and the polyvinyl alcohol-based resin containing the acetoacetyl group.

4. The method of claim 3, wherein a pH of the aqueous solution is 4.5 to 9.

5. The method of claim 1, wherein in the adhesive, a content of a solid of the polyvinyl alcohol-based resin including the acetoacetyl group is within a range of 1 to 10 weight %.

6. The method of claim 1, wherein the amine-based metal compound crosslinking agent is a metal mixture containing an amine-based ligand.

7. The method of claim 6, wherein the metal mixture includes one or more types of amine groups selected from a group consisting of a primary amine, a secondary amine, a tertiary amine, and ammonium hydroxide, as a ligand, in one or more transition metals selected from a group consisting of zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), and platinum (Pt).

8. The method of claim 1, wherein a maximum stretching magnification of the polyurethane film is five times or more.

9. The method of claim 1, further comprising dyeing the film laminate with at least one of iodine and dichroic dye before the stretching of the film laminate is performed.

10. The method of claim 1, wherein the stretching of the film laminate is performed within a boric acid aqueous solution.

* * * * *